(12) United States Patent
Tellado et al.

(10) Patent No.: US 6,711,412 B1
(45) Date of Patent: Mar. 23, 2004

(54) INTERFERENCE MITIGATION IN WIRELESS COMMUNICATIONS BY TRAINING OF INTERFERING SIGNALS

(75) Inventors: Jose Tellado, Stanford, CA (US); Peroor K. Sebastian, Mountain View, CA (US)

(73) Assignee: Iospan Wireless, Inc., San Jose, CA (US)

( * ) Notice: Subject to any disclaimer, the term of this patent is extended or adjusted under 35 U.S.C. 154(b) by 367 days.

(21) Appl. No.: 09/687,965

(22) Filed: Oct. 13, 2000

(51) Int. Cl.$^7$ .............................................. H04B 15/00
(52) U.S. Cl. ........................ 455/506; 455/423; 455/67.3
(58) Field of Search ................................ 455/296, 304, 455/305, 306, 345, 422, 423, 447, 448, 63, 67.3, 586, 67.1, 67.6; 375/349, 351, 346; 379/345–352

(56) References Cited

U.S. PATENT DOCUMENTS

| | | | |
|---|---|---|---|
| 5,592,490 A | 1/1997 | Barratt et al. ................ 370/310 |
| 5,815,488 A | 9/1998 | Williams et al. | |
| 5,828,658 A | 10/1998 | Ottersten et al. ........... 370/310 |
| 5,933,421 A | 8/1999 | Alamouti et al. | |
| 5,933,768 A | 8/1999 | Skold et al. ................ 455/296 |
| 6,064,662 A | 5/2000 | Gitlin et al. | |
| 6,144,711 A | 11/2000 | Raleigh et al. | |

FOREIGN PATENT DOCUMENTS

WO    WO 98/09381    3/1998

OTHER PUBLICATIONS

Michael Speth et al., "Broadband transmission using OFDM: system performance and receiver complexity," 1998 IEEE, PP 99.

Paulraj, A., *Taxonomy of space–time processing for wireless networks,* IEE Proc—Radar Sonar Navig., vol. 145, No. 1, Feb. 1998.

*Primary Examiner*—Lester G. Kincaid
*Assistant Examiner*—Charles Craver
(74) *Attorney, Agent, or Firm*—Lumen Intellectual Property Services, Inc.

(57) ABSTRACT

A method and wireless communication system for identifying one or more undesired signals at a multiple input receive unit receiving a desired signal or several desired signals and the undesired signal or signals. A separability condition between the desired signal and undesired signal is provided to enable that the undesired signal can be identified at the multiple input receive unit. The separability condition includes the use of substantially coherent reception at the receive unit and the use of separable training patterns for the desired and undesired signals. Zero tones are included in desired and undesired signals to further enhance signal separability. Signal training at the receive unit is used to derive the corresponding channel matrices for the interferers and mitigate their effects.

34 Claims, 6 Drawing Sheets

INTERFERENCE MITIGATION IN WIRELESS COMMUNICATIONS BY TRAINING OF INTERFERING SIGNALS

FIELD OF THE INVENTION

The present invention relates generally to interference mitigation in wireless communication systems and in particular to interference mitigation by training of interfering signals in wireless communication systems employing multiple input receive units.

BACKGROUND OF THE INVENTION

Wireless communication systems serving stationary and mobile wireless subscribers are rapidly gaining popularity. Numerous system layouts and communications protocols have been developed to provide coverage in such wireless communication systems.

Currently, most wireless systems are broken up into separate coverage areas or cells. Typically, each cell has a base station equipped with an antenna for communicating with mobile or stationary wireless devices located in that cell. A cellular network consists of a number of such cells spanning the entire coverage area. The network has an assigned frequency spectrum for supporting communications between the wireless devices of subscribers and base stations in its cells. One of the constraints on a wireless communication system is the availability of frequency spectrum. Hence, any wireless system has to be efficient in using its available frequency spectrum.

It is well-known that attenuation suffered by electromagnetic wave propagation allows wireless systems to re-use the same frequency channel in different cells. The allowable interference level between signals transmitted in the same frequency channel determines the minimum separation between cells which can be assigned the same frequency channel. In other words, frequency channel re-use patterns are dictated by the amount of Co-Channel Interference (CCI) seen by the receiving unit (either the base station or the wireless subscriber device).

Clearly, high spectral efficiency is a desirable system characteristic. By reducing CCI the C/I ratio can be improved and the spectral efficiency increased. Specifically, improved C/I ratio yields higher per link bit rates, enables more aggressive frequency re-use structures (closer spacing between cells re-using the same frequency channels) and increases the coverage of the system.

It is known in the communication art that receiving stations equipped with antenna arrays, rather than single antennas, can improve receiver performance. Antenna arrays can both reduce the effects of multipath fading of the desired signal and suppress interfering signals or CCI. Such arrays can consequently increase both the range and capacity of wireless systems. This is true for instance of wireless cellular telephone and other mobile systems.

In mobile systems, a variety of factors cause signal corruption. These include interference from other cellular users within or near a given cell. Another source of signal degradation is multipath fading, in which the received amplitude and phase of a source varies over time. The fading rate can reach as much as 200 Hz for a mobile user traveling at 60 mph at PCS frequencies of about 1.9 GHz. In such environments, the problem is to cleanly extract the signal of the user being tracked from the collection of received noise, CCI, and desired signal portions summed at the antennas of the array.

In Fixed Wireless Access (FWA) systems, e.g., where the receiver remains stationary, signal fading rate is less than in mobile systems. In this case, the channel coherence time or the time during which the channel estimate remains stable is longer since the receiver does not move. Still, over time, channel coherence will be lost in FWA systems as well.

Antenna arrays enable the system designer to increase the total received signal power, which makes the extraction of the desired signal easier. Signal recovery techniques using adaptive antenna arrays are described in detail, e.g., in the handbook of Theodore S. Rappaport, *Smart Antennas, Adaptive Arrays, Algorithms, & Wireless Position Location*; and Paulraj, A. J. et al., "Space-Time Processing for Wireless Communications", IEEE Signal Processing Magazine, November 1997, pp. 49–83.

Some of the techniques for increasing total received signal power use weighting factors (for broadband cases these are filters such as space-time or space-frequency combiners) to multiply the signal recovered at each antenna of the array prior to summing the weighted signals. Given that antenna arrays offer recognized advantages including greater total received signal power, a key issue is the optimal calculation of the weighting factors used in the array. Different approaches to weight generation have been presented in the art.

If the channels of the desired and interfering signals are known, the weight generation technique that maximizes the signal-to-interference-plus-noise ratio (SINR), as well as minimizes the mean squared error (MMSE) between the output signal and the desired output signal, is the well-known Weiner-Hopf equation:

$$w = [R_{xx}]^{-1} r_{xd},$$

where $r_{xd}$ denotes the crosscorrelation of the received signal vector x with the desired signal, given by:

$$r_{xd} = E[x^* d],$$

where d is the desired signal, and $R_{xx}$ is the received signal correlation matrix, which in turn is defined as:

$$R_{xx} = E[x^* x^T],$$

where the superscript * denotes complex conjugate and T denotes transpose.

Of course, this technique is only one of many. Other prior art techniques known in the art include joint detection of signal and interferers, successive interference canceling as well as space-time or space-frequency filtering and other techniques. More information about these techniques can be found in the above-cited references by Theodore Rapapport and Paulraj, A. J., as well as other publications.

Interference mitigation including CCI reduction for the purpose of increasing spectral efficiency of cellular wireless systems particularly adapted to a system using adaptive antenna arrays has been addressed in the prior art. For example, U.S. Pat. No. 5,819,168 to Golden et al. examines the problem of insufficient estimation of CCI and noise in communication channels which leads to an inability to suppress interference. In particular, Golden teaches to solve the problems associated with correct estimation of the $R_{xx}$ correlation matrix by an improved strategy for determining the weighting coefficients to modify $R_{xx}$ based on the ratio of interference to noise.

U.S. Pat. No. 5,933,768 to Sköld et al. addresses the problem of interference suppression with little knowledge of the interfering signal. This is done by detecting a training sequence or other portion of the interfering signal whose structure is unknown to the receiver, estimating the interferer channel and using this information in a joint demodulation receiver. The training sequences come from a finite set of known training sequences. Typically, interferer channel is calculated for all training sequences from the finite set and the best value selected based on residual interference. Matters are further complicated because the training sequences of the interferers arrive at the receiver at undetermined times. The channel estimation is thus performed user by user and results in poor channel estimates of the interferers since their training sequences can overlap the higher powered random data sequence of the desired user signal.

In yet another communication system as taught in U.S. Pat. No. 5,448,753 to Ahl et al. interference is avoided. This is done by coordinating the direction and transmission times of the beams such that they do not cross. In this manner interference between switched beams in a network and especially between beams from adjacent base stations can be avoided. A significant effort has to be devoted to coordination between the users and the base stations in this scheme. Additionally, this technique only works in areas where there is a significant proportion of line-of-sight (LOS) paths between transmitters and receivers.

Unfortunately, the above-discussed and other methods to improve spectral efficiency by CCI suppression in wireless systems including adaptive antenna array systems do not exhibit sufficiently high performance. Thus, it would be desirable to improve interference suppression in wireless systems using antenna arrays and specifically using multiple input receive units. In particular, it would be desirable to improve CCI suppression such that a higher rate of frequency re-use could be employed in wireless systems.

SUMMARY

The present invention provides a method for identifying one or more undesired signals at a multiple input receive unit in a wireless communication system. In accordance with the method, the multiple input receive unit receives a desired signal or several desired signals and an undesired signal or several undesired signals. The desired signals are intended for the multiple input receive unit and the undesired signals are usually intended for a different receive unit. A separability condition between the desired signal and undesired signal is provided to ensure that the undesired signal can be identified at the multiple input receive unit.

The separability condition according to the invention can be provided for in several ways. In one embodiment the desired signal has a tone at which no information is transmitted or a zero tone for separability. It is advantageous that in this case the undesired signal have a first training pattern substantially at the zero tone, i.e., at the zero tone frequency of the desired signal. Further separability is ensured when the desired signal is provided with an initial training pattern and the undesired signal is provided with a zero tone substantially at the initial training pattern, i.e., at the frequency used by the initial training pattern.

In another embodiment of the invention, the initial training pattern of the desired signal and the first training pattern of the undesired signal are separable. This can be achieved when the initial and first training patterns are linearly independent at the receive unit. For example, the initial and first training patterns can be orthogonal to ensure separability. Additionally, the initial and first training patterns can be transmitted at a boosted power level to ensure good reception at the multiple input receive unit. The first training pattern is conveniently used to train the undesired signal to determine a channel matrix for the undesired signal. Likewise, the initial training pattern is used to train the desired signal and determined the channel matrix for the desired signal. Once the channel matrices are known the effects of the undesired signal can be mitigated, e.g., the undesired signal can be cancelled by the receive unit.

In the same or another embodiment the initial training pattern is transmitted at an initial carrier frequency $f_k$. The first training pattern of the undesired signal is transmitted at an offset carrier frequency. In a particular example, when the communication system is an OFDM system the offset carrier frequency is $f_{k+m}$, where m is an integer. The initial and offset carrier frequencies can be chosen in accordance with a scheme or randomly. It is convenient, however, when the offset carrier frequency is proximate the initial carrier frequency $f_k$ such that the channel does not experience considerable variation between these two carrier frequencies. Furthermore, in a particularly convenient embodiment linearly independent training patterns are used in conjunction with zero tones.

In yet another embodiment, the separability condition is provided by ensuring appropriate transmission of the desired and undesired signals. Specifically, these signals are transmitted such that they are received in substantial coherence at the multiple input receive unit. This can be achieved by coordinating signal transmission. Coherent reception is advantageously practiced in conjunction with the use of offset training patterns and zero tones.

In another embodiment, a second undesired signal received at the multiple input receive unit is provided with a second separability condition between the desired signal and the second undesired signal. The second separability condition ensures that the second and desired signals are separable at the multiple input receive unit and that the second undesired signal can be thus identified. In particular, separability can be ensured by providing the second undesired signal with a second training pattern separable from the initial training pattern of the desired signal at the receive unit. This second training pattern can be transmitted at a boosted power level. Further separability can be ensured by the use of zero tones and/or coordinated transmission of desired signal and second undesired signal to achieve substantially coherent reception.

The second training pattern is conveniently used for training the second undesired signal. In some cases the undesired signal is a strong interfering signal and has to be mitigated, e.g., canceled for proper reception of the desired signal at the receive unit. At the same time, the second undesired signal is typically a weak interfering signal and it may not require direct mitigation. However, in cases where the second undesired signal is not sufficiently weak or as desired by the system designer, the second undesired signal is trained using the second training pattern. The channel matrix is then derived and used for mitigation.

The method of invention further includes training of the undesired signals at the multiple input receive unit. For this purpose the training patterns used are separable from each other. It is also convenient that no data is transmitted at the carrier frequencies on which training patterns are transmitted. In fact, it is most convenient when zero tones are assigned such that any carrier frequency is used for transmitting a training pattern of only one signal while other signals have zero tones at this carrier frequency.

A wireless communication system of the invention identifies undesired signals by using the separability condition. The system has transmit units which transmit signals, including desired and undesired signals. A control and processing device (e.g., central system control) or a collection of devices provide the separability condition between the desired and undesired signals. A receive processing unit at the multiple input receive unit identifies the undesired signal. The transmit units can include local transmit units and remote transmit units.

For example, the local transmit unit is a base station transceiver of a local cell in which the multiple input receive unit is located. The local transmit unit transmits the desired signal to the receive unit. The remote transmit units are base station transceivers of remote cells and their transmitted signals are undesired signals, e.g., strong interfering signals to the multiple input receive unit located in the local cell. Some more remote transmit unit transmit second undesired signals, e.g., weak interfering signals. The transmit units can be multiple output transmit units, thus creating a MIMO (Multiple Input Multiple Output) communication system.

A detailed description of the invention and the preferred and alternative embodiments is presented below in reference to the attached drawing figures.

DETAILED DESCRIPTION

Figure 1:
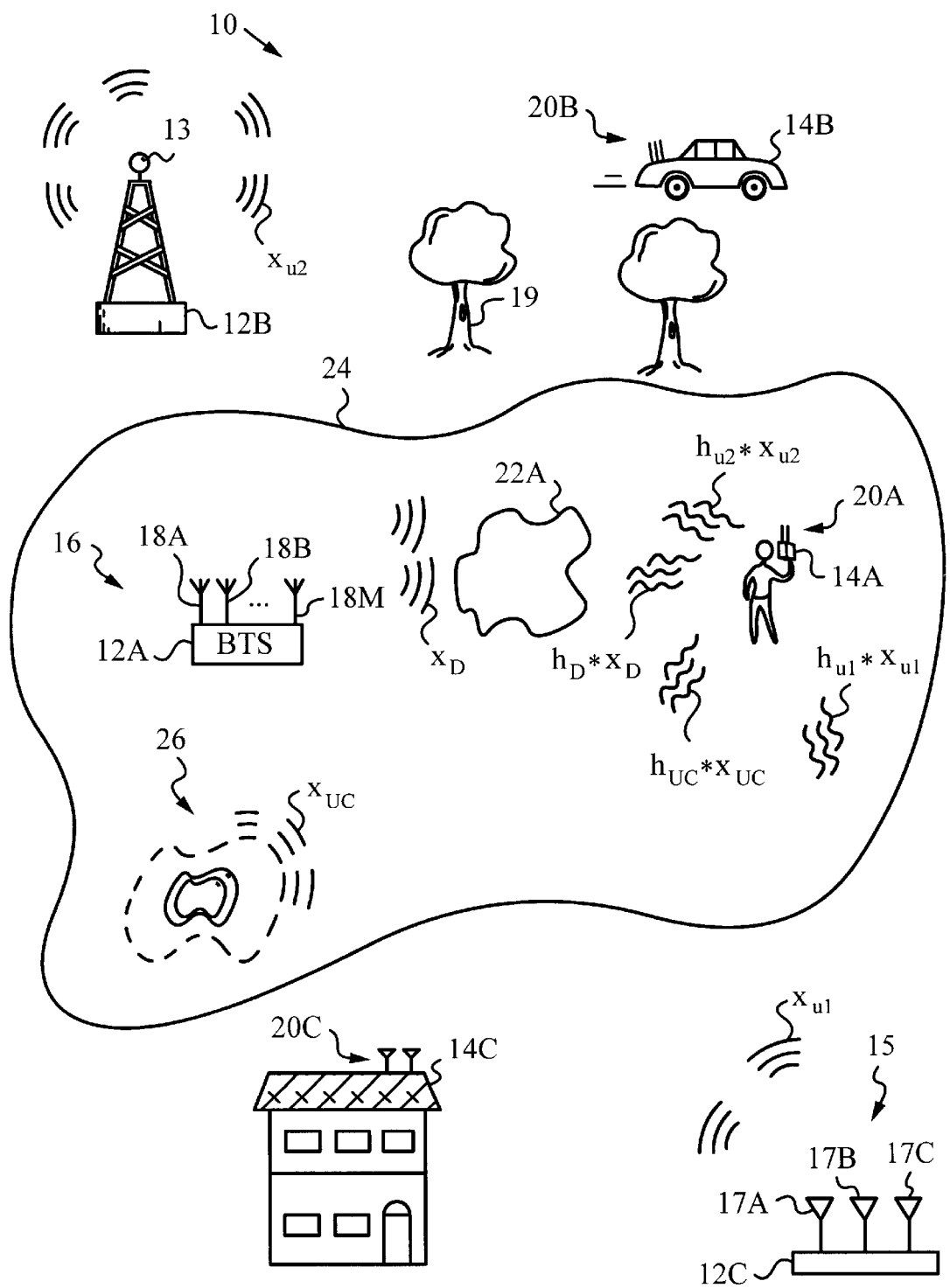
FIG. 1 is a portion of a communication system.

The method of the invention will be best understood after first considering the diagram of FIG. 1 illustrating a portion of a wireless communication system 10. For explanation purposes, downlink communication will be considered where a transmit unit 12 (12A, 12B, 12C) is a Base Transceiver Station (BTS) and a receive unit 14 (14A, 14B, 14C) is a mobile or stationary wireless user device. Of course, the method can be used in uplink communication from receive unit 14 to BTS 12.

Exemplary user devices 14 include mobile receive units such as a portable telephone 14A, a car phone 14B and a stationary receive unit 14C. Receive unit 14C can be a wireless modem used at a residence or any other fixed wireless unit. Receive units 14A, 14B and 14C are equipped with multiple antennas or antenna arrays 20A, 20B and 20C respectively. These receive units are multiple input receive units and are used in Multiple Input Multiple Output (MIMO) communications and conveniently take advantage of techniques such as spatial multiplexing or antenna diversity. Also, the transmission techniques can employ single-carrier, multi-carrier or spread spectrum communication.

A first exemplary transmit unit 12 is a BTS 12A equipped with an antenna array 16 consisting of a number of transmit antennas 18A, 18B, . . . , 18M for MIMO communications. Another exemplary transmit unit 12 is a BTS 12B equipped with a single omnidirectional antenna 13. A third transmit unit 12C has an array 15 of antennas 17A, 17B and 17C.

BTSs 12A, 12B, 12C send data in the form of signals x to receive units 14A, 14B, 14C via wireless communications channels 22. For simplicity, only channel 22A between BTS 12A and receive unit 14A is indicated. It is understood that channels 22 through which transmit signals x propagate exist between every transmit unit 12 and receive unit 14.

Receive unit 14A is located within a local coverage area 24 of BTS 12A. While receive unit 14A is within area 24 BTS 12A communicates with receive unit 14A via channel 22A by sending at least one intended or desired signal $X_D$ to receive unit 14A. Receive unit 14A receives a total signal y including desired signal $X_D$. In addition, receive signal y received by unit 14A contains undesired signals. In the present case, receive signal y contains a first undesired signal $x_{u1}$ and a second undesired signal $x_{u2}$. First undesired signal $x_{u1}$ is a strong interfering signal transmitted from BTS 12C located outside local coverage area 24. (Of course, transmit signal $x_{u1}$ is only undesired for receive unit 14A, while it is a desired signal for receive unit 14C.) First undesired signal $x_{u1}$ is a strong interferer in this case because there is a line-of-sight (LOS) channel between BTS 12C and receive unit 14A. Second undesired signal $x_{u2}$ is a weak interfering signal transmitted from BTS 12B. Second undesired signal $x_{u2}$ is a weak interfering signal because of obstacles 19, e.g., trees or other structures located between BTS 12B and receive unit 14A, contributing to multi-path, fading and general signal attenuation. Receive signal y also contains an uncontrollable signal $x_{UC}$ originating from a wireless device 26, which may be a non-system BTS or some other wireless unit located in local coverage area 24 or outside it and not controlled by system 10. Finally, receive signal y also contains noise n (not indicated).

When MIMO system 10 employs an OFDM multi-carrier transmission technique, then receive signal y[n] before processing by receive unit 14A can be described by the action of channels 22 on the individual transmit signals x by the following equation:

$$y[n]=h_D[n]*x_D[n]+h_{u1}[n]*x_{u1}[n]+h_{u2}[n]*x_{u2}[n]+h_{UC}[n]*x_{UC}[n]+n[n], \quad \text{eq. 1}$$

where all x[n] terms are transmit signal vectors, * represents the convolution operator, and the subscripts have the meanings explained above. The h[n] are the matrices representing the action of channels 22 on the corresponding transmit signal vectors. Hence, in the art h[n] are sometimes referred to as channels. The [n] index is the discrete time index at the output of the standard analog-to-digital converter (not shown) of receive unit 14A. It should be noted that there could be more than one desired signal, as well as many undesired signals (strong and weak interfering signals) and many uncontrollable signals. It should also be noted that the structure of first and second undesired signals is known, since these signals are transmitted from BTS 12C, 12B of system 10.

Figure 2:
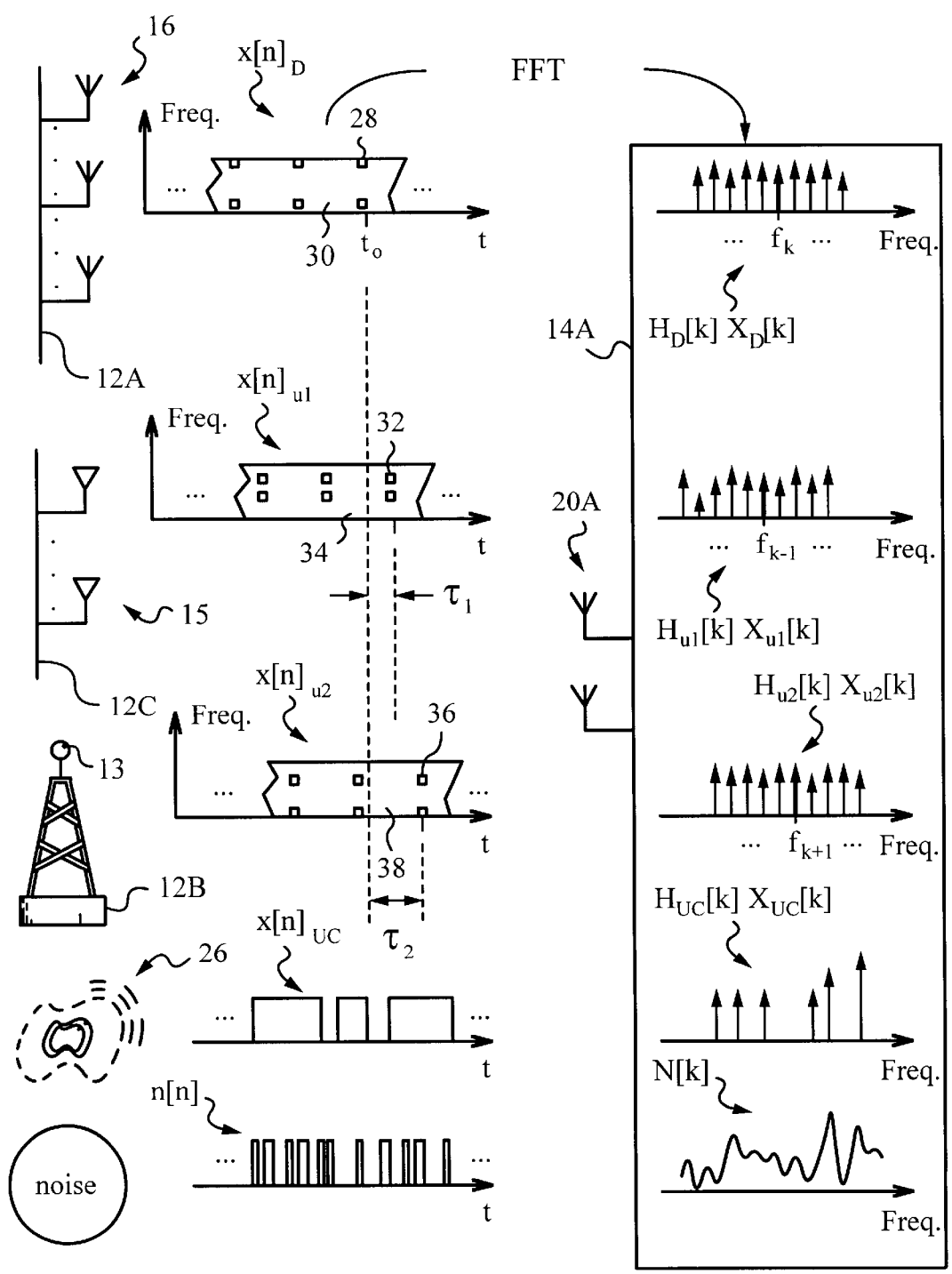
FIG. 2 is a diagram illustrating the transmit signals in the communication system of FIG. 1.

In fact, the structures of signals $x_D$, $x_{u1}$, $x_{u2}$ transmitted from BTSs 12A, 12B, 12C and signal $x_{UC}$ from uncontrolled wireless device 26 as well as noise n are better shown in the diagram of FIG. 2. As already indicated, with the exception of $x_{UC}$ and noise the signals have a known structure. It should be noted that the structure of the noise signal is inherently random and is shown for illustrative purposes only.

Desired signal $X_D$ as viewed in the time domain has an initial training pattern 28 containing training symbols followed by symbols containing data or data portion 30. This structure is recursive, as each subsequent data portion 30 is preceded by initial training pattern 28. It should be noted that training symbols are only transmitted at certain frequencies, as can be seen by observing the y-axis representing frequency. Remaining portion of signal $X_D$ contains data at frequencies between the training symbols.

Following an analogous format, first undesired signal $x_{u1}$ has a first training pattern 32 and a data portion 34. Likewise, second undesired signal $x_{u2}$ is provided with a second training pattern 36 and a data portion 38. In accordance with standard OFDM techniques, signals $x_D$, $x_{u1}$, $x_{u2}$ are processed, e.g., coded and modulated including application of the IFFT (Inverse Fast Fourier Transform), and transmitted from antenna arrays 16, 15 and omnidirectional antenna 13 of BTSs 12A, 12C and 12B respectively. Signal $x_{UC}$ form uncontrolled device 26 may or may not contain training patterns and its data format is unknown to system 10.

In order to identify first undesired signal $x_{u1}$ at receive unit 14A a separability condition is imposed such that desired signal $X_D$ and undesired signal $x_{u1}$ are separable at receive unit 14A. In accordance with one embodiment of the invention, separability is provided when first undesired signal $x_{u1}$ is received at receive unit 14A in substantial coherence with desired signal $X_D$, as illustrated in the diagram of FIG. 2. This can be accomplished by synchronizing or coordinating the transmissions of desired signal $X_D$ and first undesired signal $x_{u1}$ from BTS 12A and BTS 12C respectively such that their reception occurs within a sufficiently short delay time $\tau_1$. Preferably, delay time $\tau_1$ is nearly or equal to zero. Delay time $\tau_1$ can be longer in some cases, as long as the data contained in signal $X_D$ and at least the training data in signal $x_{u1}$ can be secured against loss. In the event system 10 employs a cyclic prefix (CP) delay time $\tau_1$ should not be significantly longer than the CP time window.

In particular, separability is enabled when the reception of initial training pattern 28 of desired signal $x_D$ and training pattern 32 of first undesired signal $x_{u1}$ is substantially coherent. A person skilled in the art will be familiar with suitable methods for synchronizing transmissions to ensure time and frequency coherence during reception. In fact, in some cases, the transmissions of all BTSs belonging to system 10 can be synchronized for substantially coherent reception of desired and first undesired signals $x_D$, $x_{u1}$, for all receive units.

Because of substantial coherence in reception, receive unit 14A can synchronize to incoming desired signal $x_D$ and first undesired signal $x_{u1}$. Specifically, receive unit 14A synchronizes to the incoming OFDM waveforms of desired signal $x_D$ and first undesired signal $x_{u1}$. After applying the FFT (Fast Fourier Transform) the received symbol Y[k] obtained by receive unit 14A in the frequency domain is:

$$Y[k]=H_D[k]X_D[k]+H_{u1}[k]X_{u1}[k]+H_{u2}[k]X_{u2}[k]+H_{UC}[k]X_U[k]+N[k],\qquad\text{eq. 2}$$

where the [k] index represents each OFDM tone or frequency.

The data symbols $X_D[k]$ can be estimated from equation 2 by applying well-known techniques, e.g., MMSE receiver (Minimum Mean Square Error) and determining the cross correlation between the input and output vectors using the auto-correction of the output vectors. In accordance with the invention, the quality of these correlator estimators is significantly improved by estimating one or more of channel matrices $H_D$, $H_{u1}$, $H_{u2}$ and $H_{UC}$ instead. These channel matrices are estimated by training.

In one embodiment only first undesired signal $x_{u1}$ is trained to estimate channel matrix $H_{u1}$ for first undesired signal $x_{u1}$. This is accomplished by using first training pattern 32 of first undesired signal $x_{u1}$, received in substantial coherence with initial training pattern 28 of desired signal $X_D$, and using first training pattern 32 to train first undesired signal $x_{u1}$. Channel matrix $H_{u1}$ is determined once first undesired signal $x_{u1}$ is trained by any suitable technique known in the art. Once channel matrix $H_{u1}$ of interfering signal $x_{u1}$ is known, its effects can be mitigated. For example, first undesired signal $x_{u1}$ can be cancelled by receive unit 14A. Of course, receive unit 14A contains the necessary circuits to receive and process desired signal $X_D$ and undesired signal $x_{u1}$ as described.

Conveniently, initial training pattern 28 of desired signal $X_D$ is transmitted at an initial tone or initial carrier frequency $f_k$. First training pattern 32 of first undesired signal $x_{u1}$ is transmitted at an offset tone or offset carrier frequency proximate the initial carrier frequency $f_k$. Training patterns 28, 32 can contain training symbols or other training information as is known in the art.

To further improve separability at receive unit 14A training patterns 28, 32 are selected such that they are linearly independent from each other at receive unit 14A. In fact, training patterns 28, 32 can be selected from among orthogonal training sequences such as Walsh functions or other sets of orthogonal sequences.

In system 10 using OFDM offset carrier frequency is $f_{k-1}$. This offset frequency is adjacent initial carrier frequency $f_k$. In fact, offset carrier frequency can be $f_{k\pm m}$, where m is an integer. However, it is advantageous to keep m small such that initial training pattern 28 and first training pattern 32 are transmitted at frequencies that are close to each other, since the channel generally does not vary substantially for such closely spaced frequencies.

Of course, the choice of carrier frequencies for training patterns 28, 32 can be changed at any time during operation to ensure good estimates of channel matrices $H_D$ and $H_{u1}$. For example, a permanent assignment of training patterns to particular carrier frequencies may be disadvantageous if these frequencies are in a deep fade or if there is strong interference at these carrier frequencies. In this situation training patterns 28, 32 can be assigned to different carrier frequencies $f_k$, $f_{k\pm m}$ in accordance with a schedule or randomly. Such "frequency hopping" assignment of training patterns 28, 32 can be performed by a suitable centralized controller or a distributed coordinated controller.

In this embodiment the effects of second undesired signal $x_{u2}$ and uncontrolled signal $x_{UC}$ are considered together with noise n[n]. In other words, channel matrices $H_{u2}$ and $H_{UC}$ are not estimated. Hence, this embodiment is effective when second undesired signal $x_{u2}$ and uncontrolled signal $x_{UC}$ are very weak.

In another embodiment, both first undesired signal $x_{u1}$ and second undesired signal $x_{u2}$ are trained by using first and second training patterns 32 and 36 to estimate channel matrices $H_{u1}$ and $H_{u2}$. In this embodiment BTS 12B of system 10 is synchronized to ensure substantially coherent reception of desired signal $x_D$ and second undesired signal $x_{u2}$ for separability at transmit unit 14A. Specifically, initial training pattern 28 and second training pattern 36 are received substantially coherently within a sufficiently small delay time $\tau_2$. Preferably, delay time $\tau_2$ is nearly or equal to zero. In some cases delay time $\tau_2$ is longer, but shorter than the CP time window used by system 10, as explained above.

Initial training pattern 28 is transmitted at initial carrier frequency $f_k$, first training pattern 32 is transmitted at offset carrier frequency $f_{k-1}$ and second training pattern 36 is transmitted at offset carrier frequency $f_{k+1}$. Once again, these assignments do not need to be permanent, as explained above. Conveniently, training patterns 28, 32 and 36 are selected such that they are linearly independent at receive unit 14A to further improve separability.

Figure 3A:
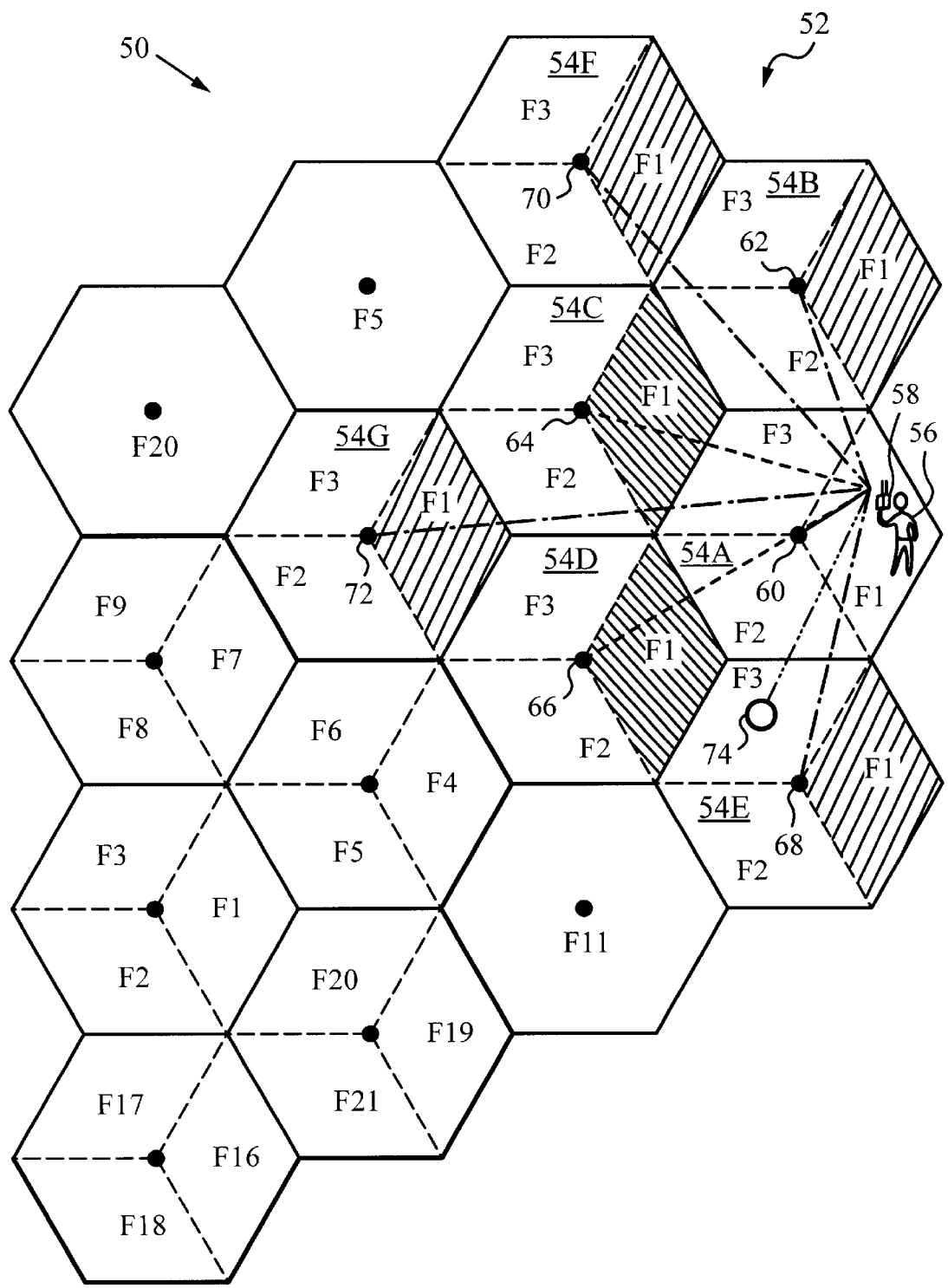
FIG. 3A is a schematic showing an embodiment of the invention in a cellular communication system.

FIG. 3A illustrates a cellular system 50 in which the method of invention is applied. System 50 does not have to be an OFDM system and can use other multiple carrier frequency schemes. System 50 employs several frequency re-use schemes in different regions. Training of undesired signals can be practiced in any region with these re-use schemes or any other re-use schemes. It should be noted that the ability to estimate channel matrices for strong and weak interfering signals as taught be the invention will generally allow a high or aggressive frequency re-use scheme.

Specifically, in portion 52 of cellular system 50 a 1×3 re-use scheme is employed. Accordingly, cells 54A–G have three sectors each using a different frequency bands simply referred to as channel frequencies $F_1$, $F_2$, $F_3$ respectively. These three channel frequencies are re-used in each cell. A user 56 with a multiple input portable wireless receive unit 58 is shown in local cell 54A in the sector using channel frequency $F_1$.

Figure 3B:
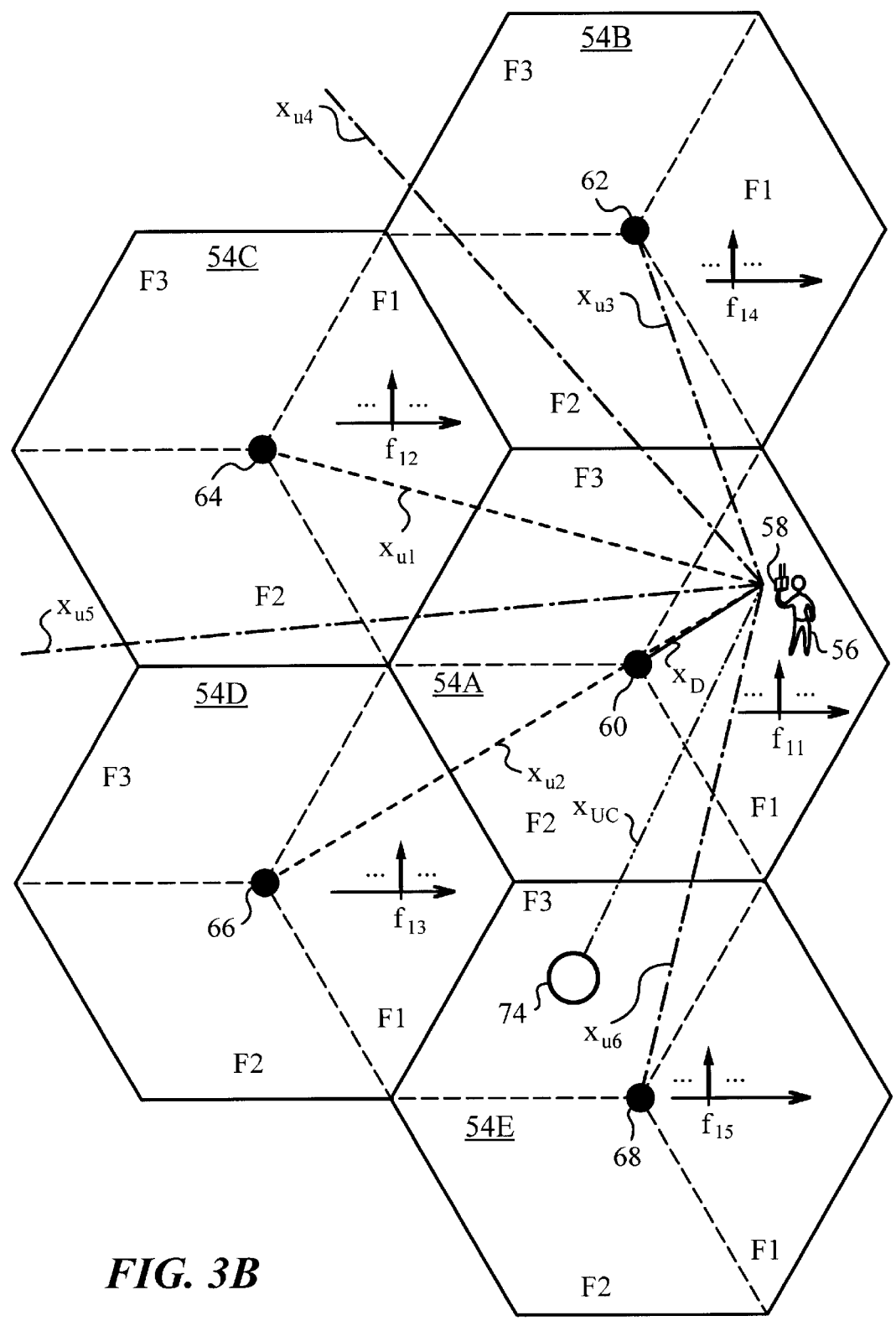
FIG. 3B is a more detailed schematic of a portion of the cellular communication system of FIG. 3A.

Referring now to the more detailed view of the relevant cells of system 50 as shown in FIG. 3B, desired signal $x_D$ propagates from local BTS 60 to unit 58 and is indicated in a solid line. Unit 58 receives two strong interfering signals $x_{u1}$, $x_{u2}$ indicated in dashed lines from BTSs 64 and 66 belonging to remote cells 54C, 54D. Also, unit 58 receives four weak interfering signals $x_{u3}$, $x_{u4}$, $x_{u5}$ and $x_{u6}$ indicated in dashed and dotted lines from BTSs 62, 68, 70, 72 of remote cells 54B, 54E, 54F and 54G respectively. An uncontrolled non-system source 74 transmits an uncontrolled signal $x_{UC}$ indicated in dashed and double dotted line to unit 58. In this embodiment weak interfering signals $x_{u4}$, $x_{u5}$ are not trained because their interference effects are very weak.

In accordance with the invention, desired signal $X_D$, strong interfering signals $x_{u1}$, $x_{u2}$ as well as weak interfering signals $x_{u3}$, $x_{u6}$ are provided with training patterns which are separable at receive unit 58. A different carrier frequency is used for transmitting each of the training patterns, as schematically indicated. Initial carrier frequency $f_{11}$ is used for transmitting initial training pattern of desired signal $X_D$, $f_{12}$ and $f_{13}$ are used for training patterns of strong interfering signals $x_{u1}$, $x_{u2}$, and $f_{15}$, $f_{16}$ are used for training patterns of weak interfering signals $x_{u3}$, $x_{u6}$. The re-use scheme of carrier frequencies for transmitting training patterns is different from the re-use scheme of channel frequencies. For proper training of desired and interfering signals at receive unit 58 the re-use scheme of carrier frequencies for training pattern can be less aggressive, e.g., 5×3, than channel frequency re-use. A person of average skill in the art will appreciate that less aggressive carrier frequency re-use for training patterns will ensure better estimates of $R_{xd}$ or $H_{interf}$ matrices and this, in turn, a higher SINR of training tones at receive unit 58. Thus, more reliable training of interfering signals is achieved in system 50.

The transmissions of BTSs 60 through 68 are coordinated such that substantially coherent reception of training patterns of interfering $x_{u1}$, $x_{u2}$, $x_{u3}$, $x_{u6}$ signals with the initial training pattern of desired signal $x_D$ is achieved. Receive unit 58 uses the training patterns of the interfering signals to train these signals and determine the channel matrices for these signals. After the channel matrices of the interfering signals are known, unit 58 employs an interference mitigation technique, e.g., canceling to eliminate the effect of the interfering signals.

Figure 4A:
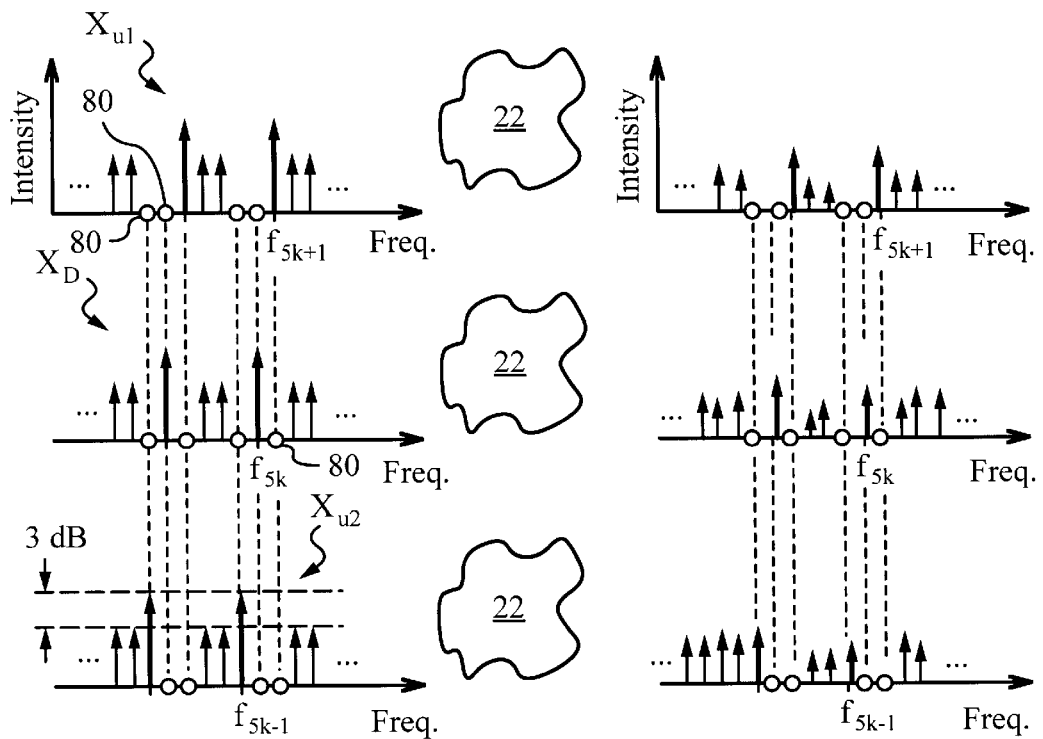
FIG. 4A is a diagram showing a desired signal, a first undesired signal and a second undesired signal in the frequency domain.

The method of the invention also employs tones which transmit no symbols or zero tones to further improve separability of signals and enable mitigation of interfering signals which are not trained at receive unit 58, e.g., uncontrolled signal $x_{UC}$. FIG. 4A illustrates desired signal $x_D$ in the frequency domain with initial training patterns at carrier frequencies $f_{5k}$, where k is an integer. Two undesired signals $x_{u1}$, $x_{u2}$ have first and second training patterns at carrier frequencies $f_{5k+1}$ and $f_{5k-1}$ respectively. In this example both undesired signals $x_{u1}$, $x_{u2}$ are sufficiently strong interfering signals to require mitigation.

Desired signal $x_D$ is transmitted with two zero tones 80 at carrier frequencies $f_{5k+1}$ and $f_{5k-1}$. In other words, zero tones 80 of desired signal $x_D$ correspond to carrier frequencies of training patterns of interfering signals $x_{u1}$, $x_{u2}$. When desired signal $x_D$ is received at receive unit 58, carrier frequencies $f_{5k+1}$ and $f_{5k-1}$ are used to "listen in" for training patterns of undesired signals $x_{u1}$, $x_{u2}$ whose training patterns are transmitted on these carrier frequencies. In this manner, the presence of zero tones 80 improves the separability of desired and undesired signals at receive unit 58.

Interfering signals $x_{u1}$, $x_{u2}$ also have zero tones 80 at carrier frequency $f_{5k}$ corresponding to initial training pattern of desired signal $x_D$. Further, interfering signals $x_{u1}$, $x_{u2}$ have zero tones 80 at frequencies $f_{5k-1}$ and $f_{5k+1}$ respectively. Provision of zero tones 80 in interfering signals in this manner ensures improved separability of initial training pattern and their respective training patterns at receive unit 58.

To further improve separability the training patterns or the symbols of training patterns can be transmitted at a boosted power level, as also illustrated in FIG. 4A. The boosted power level or intensity at carrier frequencies with the training patterns is indicated by the taller arrows. In this case a 3 dB boost is employed.

The effects of channel 22 cause signals received by receive unit 58 to experience various deleterious effects. The signals obtained at receive unit 58 are shown on the right. It can be seen that training symbols of first undesired signal $X_{u1}$ have faded such that training and hence determination of channel matrix $H_{u1}$ may be difficult. However, the power boosting has ensured that the training symbols still have sufficient power for training at receive unit 58. The same is true for both desired signal $X_D$ as well as second undesired signal $X_{u2}$. A person skilled in the art will know how to apply power boosting as necessary to improve training of interferers and desired signal.

Figure 4B:
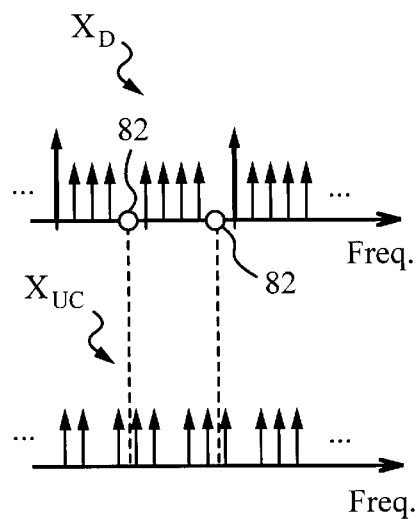
FIG. 4B is a diagram showing a desired signal with zero tones and an uncontrolled signal in the frequency domain.

In addition to their use for enabling better separability of training patterns, zero tones can also be used for "listening in" on other interfering signals, e.g., uncontrolled signal $x_{UC}$, weaker interfering signals such as $x_{u4}$, $x_{u5}$ in FIG. 3B, or even to "listen in" on the noise. FIG. 4B illustrates a desired signal $x_D$ with zero tones 82 for listening in on undesired signal $x_{UC}$. Since the structure of $x_{UC}$ is not known, it may not be possible to locate zero tones 82 at frequencies corresponding to the tones of signal $x_{UC}$. In fact, $x_{UC}$ may have a completely different format from that used by the signals of system 50. Nonetheless, in accordance with the invention, the correlation of $H_{UC}X_{UC}$ is estimated from $x_{UC}$ sampled at zero tones 82 and appropriate mitigation measures are employed by receive unit 58 to mitigate the effects of $x_{UC}$ at receive unit 58.

Figure 5:
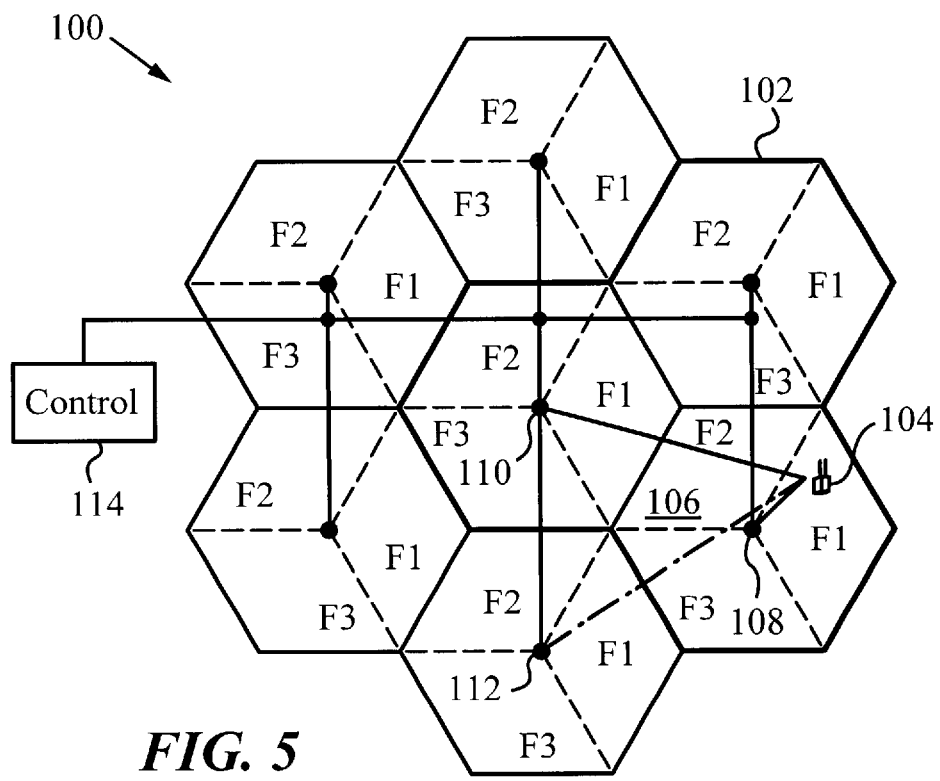
FIG. 5 is a schematic showing the method of the invention in another cellular communication system.

FIG. 5 illustrates another cellular system 100 with a 1×3 frequency re-use scheme. A multiple input wireless receive unit 104 is located in a cell 106 of a three cell cluster 102 using nine channel frequencies $F_1$ through $F_9$. In this embodiment two desired signals indicated by solid lines are transmitted from BTSs 108 and 110 to receive unit 104. An interfering signal indicated by a dashed and dotted line is received by receive unit 104 from BTS 112. In this less aggressive re-use scheme it may be sufficient to train interfering signal from BTS 112 while not training other interfering signals. In fact, zero tones can be used to listen in on the weak interferers and mitigate their effects as described above.

In accordance with the invention, a central control unit 114 is provided to control the transmission from the BTSs such that the two desired signals and the interfering signal are received coherently at receive unit 104. Central control unit 114 can also determine the appropriate set of training patterns, e.g., orthogonal training symbols, the schedule by which these training patterns are assigned, e.g., random frequency assignment and other operating parameters of system 100. Of course, central control unit 114 can be replaced by appropriately synchronized control units residing at each BTS and performing the same functions.

Figure 6:
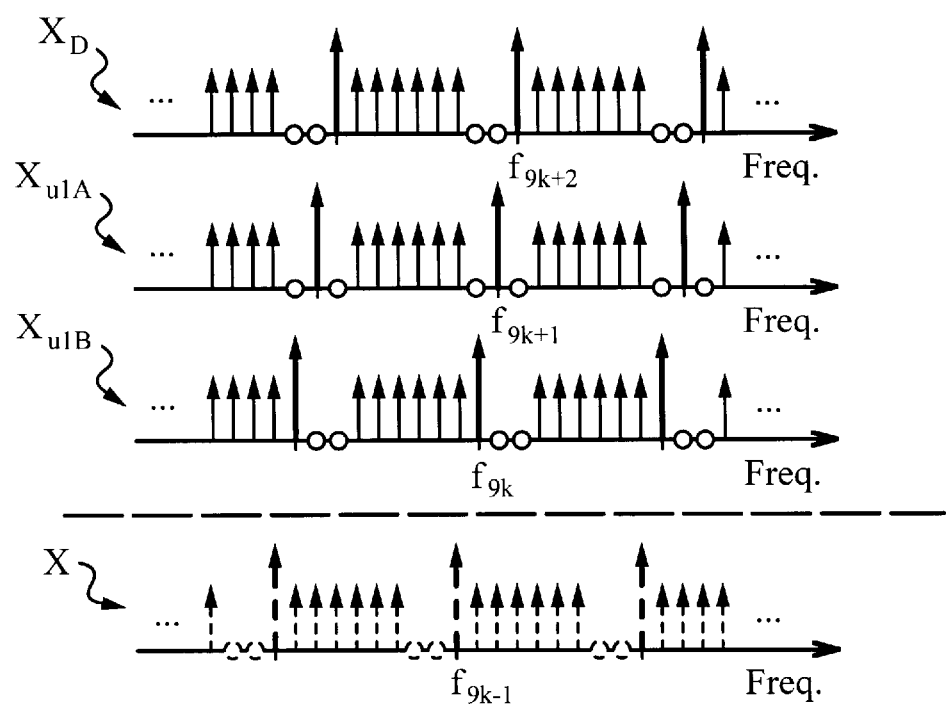
FIG. 6 is a diagram illustrating another embodiment of the method as applied in an OFDM communication system.

In a particularly convenient embodiment, the desired signal $x_D$ and strong interfering undesired signals $x_{u1A}$, $x_{u1B}$ are provided with training patterns at boosted power levels as indicated in FIG. 6. All three signals use zero tones for improved separability as discussed above. In addition, a fourth signal x which is not a strong interfering signal for desired signal $x_D$ is indicated. One of the tones used by signals $x_D$, $x_{u1A}$, $x_{u1B}$ for transmitting their data is used for transmitting the training pattern of fourth tone x. In fact, a 9×3 training pattern frequency re-use can be practiced in this manner.

It will be clear to one skilled in the art that the above embodiments may be altered in many ways without departing from the scope of the invention. Accordingly, the scope of the invention should be determined by the following claims and their legal equivalents.

What is claimed is:

1. A method for identifying undesired signals at a multiple input receive unit in a wireless communication system, said method comprising:
   a) receiving at said multiple input receive unit a desired signal and an undesired signal;
   b) providing a separability condition between said desired signal and said undesired signal, wherein said separability condition comprises providing a zero tone in said desired signal; and
   c) identifying said undesired signal at said multiple input receive unit using said separability condition.

2. The method of claim 1, further comprising providing said undesired signal with a first training pattern substantially at said zero tone.

3. A method for identifying undesired signals at a multiple input receive unit in a wireless communication system, said method comprising:
   a) receiving at said multiple input receive unit a desired signal and an undesired signal;
   b) providing a separability condition between said desired signal and said undesired signal; wherein providing said separability condition comprises providing said desired signal with an initial training pattern and providing a zero tone in said undesired signal substantially at said initial training pattern; and
   c) identifying said undesired signal at said multiple input receive unit using said separability condition.

4. A method for identifying undesired signals at a multiple input receive unit in a wireless communication system, said method comprising:
   a) receiving at said multiple input receive unit a desired signal and an undesired signal;
   b) providing a separability condition between said desired signal and said undesired signal; and
   c) identifying said undesired signal at said multiple input receive unit using said separability condition; wherein providing said separability condition comprises:
      providing said desired signal with an initial training pattern; and
      providing said undesired signal with a first training pattern separable from said initial training pattern at said multiple input receive unit; wherein said initial training pattern and said first training pattern are linearly independent at said multiple input receive unit.

5. The method of claim 4, wherein said initial training pattern and said first training pattern are orthogonal at said multiple input receive unit.

6. The method of claim 4, wherein said first training pattern is used for determining a channel matrix for said undesired signal.

7. The method of claim 4, wherein said initial training pattern and said first training pattern are transmitted at a boosted power level.

8. The method of claim 4, wherein said initial training pattern is transmitted at an initial carrier frequency $f_k$ and said first training pattern is transmitted at an offset carrier frequency proximate said initial carrier frequency $f_k$.

9. The method of claim 8, wherein said wireless communication system is an OFDM wireless communication system and said offset carrier frequency is $f_{k\pm m}$, where m is an integer.

10. The method of claim 8, wherein said initial carrier frequency $f_k$ and said offset carrier frequency are randomly assigned.

11. A method for identifying undesired signals at a multiple input receive unit in a wireless communication system, said method comprising:
   a) receiving at said multiple input receive unit a desired signal and an undesired signal;
   b) providing a separability condition between said desired signal and said undesired signal, wherein providing said separability condition comprises transmission of said desired signal and said undesired signal, such that said desired signal and said undesired signal are received in substantial coherence at said multiple input receive unit; and
   c) identifying said undesired signal at said multiple input receive unit using said separability condition.

12. A method for identifying undesired signals at a multiple input receive unit in a wireless communication system, said method comprising:
   a) receiving at said multiple input receive unit a desired signal and an undesired signal;
   b) providing a separability condition between said desired signal and said undesired signal;
   c) identifying said undesired signal at said multiple input receive unit using said separability condition;

d) receiving at said multiple input receive unit a second undesired signal;

e) providing a second separability condition between said desired signal and said second undesired signal; and f) identifying said second undesired signal at said multiple input receive unit using said second separability condition.

13. The method of claim 12, wherein said step of providing said second separability condition comprises:

a) providing said desired signal with an initial training pattern; and b) providing said second undesired signal with a second training pattern separable from said initial training pattern at said multiple input receive unit.

14. The method of claim 13, wherein said second training pattern is used for determining a channel matrix for said second undesired signal.

15. The method of claim 13, wherein said initial training pattern and said second training pattern are transmitted at a boosted power level.

16. The method of claim 12, wherein said step of providing said second separability condition comprises transmission of said desired signal and said second undesired signal, such that said desired signal and said second undesired signal are received in substantial coherence at said multiple input receive unit.

17. The method of claim 12, wherein said second undesired signal is a weak interfering signal and said undesired signal is a strong interfering signal.

18. A method for training undesired signals at a multiple input receive unit in a wireless communication system, said method comprising:

a) providing a desired signal with an initial training pattern;

b) providing an undesired signal with a first training pattern separable from said initial training pattern at said multiple input receive unit, wherein said initial training pattern and said first training pattern are linearly independent at said multiple input receive unit; and c) training said undesired signal using said first training pattern.

19. The method of claim 18, further comprising transmitting said desired signal and said undesired signal such that said initial training pattern and said first training pattern are received substantially coherently by said multiple input receive unit.

20. The method of claim 19, wherein said initial training pattern and said first training pattern are orthogonal at said multiple input receive unit.

21. The method of claim 18, wherein said first training pattern is used for determining a channel matrix for said undesired signal.

22. The method of claim 18, wherein said initial training pattern and said first training pattern are transmitted at a boosted power level.

23. The method of claim 18, further comprising providing a zero tone in said desired signal.

24. The method of claim 23, wherein said undesired signal is provided with said first training pattern substantially at said zero tone.

25. The method of claim 18, wherein said undesired signal is provided with a zero tone substantially at said initial training pattern.

26. The method of claim 18, further comprising:

a) providing a second undesired signal with a second training pattern separable from said initial training pattern at said multiple input receive unit; and b) training said second undesired signal using said second training pattern.

27. The method of claim 26, further comprising transmitting said second undesired signal such that said second training pattern is received substantially coherently with said initial training pattern by said multiple input receive unit.

28. The method of claim 26, wherein said second undesired signal is a weak interfering signal and said first undesired signal is a strong interfering signal.

29. The method of claim 18, wherein said initial training pattern is transmitted at an initial carrier frequency $f_k$ and said first training pattern is transmitted at an offset carrier frequency proximate said initial carrier frequency $f_k$.

30. The method of claim 29, wherein said wireless communication system is an OFDM wireless communication system and said offset carrier frequency is $f_{k \pm m}$, where m is an integer.

31. The method of claim 29, wherein said initial carrier frequency $f_k$ and said offset carrier frequency are randomly assigned.

32. The method of claim 18, further comprising canceling said undesired signal by said multiple input receive unit.

33. A method for identifying undesired signals at a multiple input receive unit in a wireless communication system, said method comprising:

a) providing a desired signal with a zero tone;

b) receiving at said multiple input receive unit said desired signal and an undesired signal;

c) identifying said undesired signal at said multiple input receive unit using said zero tone.

34. The method of claim 33, further comprising canceling said undesired signal.

* * * * *

UNITED STATES PATENT AND TRADEMARK OFFICE
CERTIFICATE OF CORRECTION

PATENT NO. : 6,711,412 B1
DATED : March 23, 2004
INVENTOR(S) : Tellado et al.

It is certified that error appears in the above-identified patent and that said Letters Patent is hereby corrected as shown below:

<u>Column 7,</u>
Line 62, delete "$X_u$" and insert -- $X_{uc}$ --.

Signed and Sealed this

Twenty-fifth Day of May, 2004

JON W. DUDAS
*Acting Director of the United States Patent and Trademark Office*